June 6, 1967   R. L. WOOLFORK   3,324,459
PROGRAM CHANGING IN DATA PROCESSING
Original Filed Dec. 7, 1960   3 Sheets-Sheet 1
FIG.1.
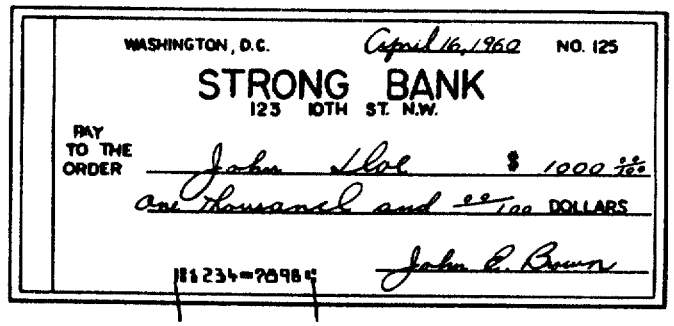
FIG.3.
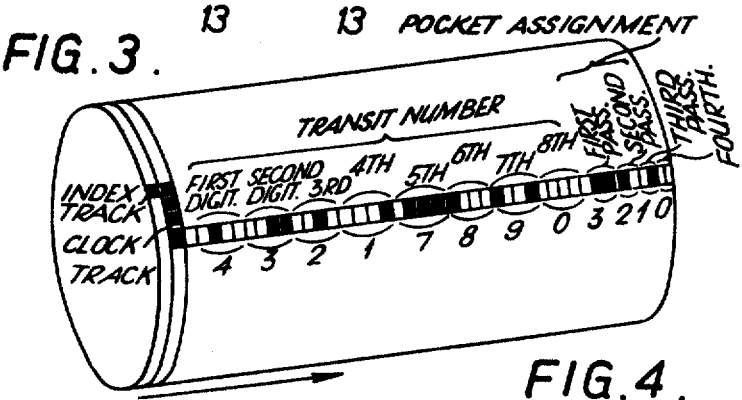
FIG.4.

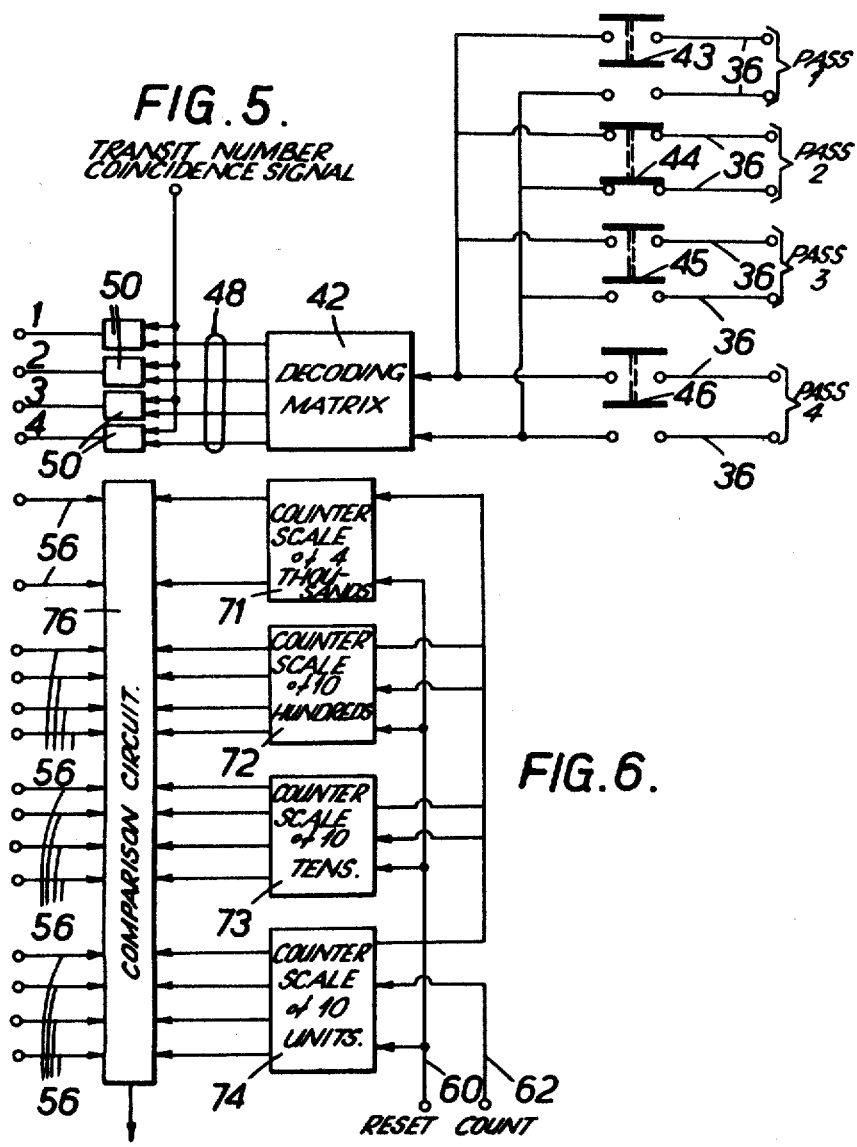

United States Patent Office 3,324,459
Patented June 6, 1967

3,324,459
PROGRAM CHANGING IN DATA PROCESSING
Robert L. Woolfolk, Dallas, Tex., assignor, by mesne assignments, to Sperry Rand Corporation, New York, N.Y., a corporation of Delaware
Original application Dec. 7, 1960, Ser. No. 74,297, now Patent No. 3,149,720, dated Sept. 22, 1964. Divided and this application Sept. 21, 1964, Ser. No. 398,004
5 Claims. (Cl. 340—172.5)

This application is a division of application Ser. No. 74,297 now Patent No. 3,149,720 of Robert L. Woolfolk, filed Dec. 7, 1960, for Program Changing in Electronic Data Processing.

This invention relates to a method and apparatus for changing the program in data processing equipment and more particularly to a method and apparatus for changing the contents of a memory storing the sorting program of an apparatus for sorting documents.

In data processing equipment the program, which directs and controls the mode of operation of the data processing equipment, is normally stored in a memory, which may for example be a magnetic drum. A program change is effected in the data processing equipment of the prior art by replacing the memory which stores the program with an entirely different memory in which a different program is stored, or by using special input for feeding a new stored program to the memory, or by changing or setting up a new program in the memory manually. If a program change is to be effected by using a plurality of different memories or by using special input then the expense of buying and maintaining this additional equipment must be borne. On the other hand, changing and setting up the program manually is a time-consuming and arduous process during which the data processing equipment cannot be used for its primary purpose. Thus the first two alternatives involve expensive additional equipment and the latter alternative involves expensive down time of the equipment and it can be readily seen that none of the means for effecting a program change is satisfactory.

The present invention provides a method and apparatus for effecting program changes in the memory of the data processing equipment by feeding the program changes into the memory through the same input facility through which information to be nomally processed by the equipment is usually fed. Special symbols precede the information fed to the system for changing the program. The system of the invention detects these symbols and in response thereto readies the system for effecting the program change in accordance with the program change information being fed through the input facility. In this manner a program change can be carried out with ease and speed and the change can be accomplished with substantially no interruption of the flow of regular data to be processed by the equipment.

The preferred embodiment of the present invention is directed particularly to data processing apparatus for sorting documents such as checks and the like. One sophisticated apparatus for sorting such documents reads numbers off the documents to be sorted and compares them with the numbers stored in a memory. When the number stored in the memory is found to coincide with the number read off a document to be sorted, a pocket assignment stored with the number in the memory is read out from the memory and this pocket assignment selects the pocket into which the document is to be directed. There are usually a plurality of pocket assignments stored with each number in the memory, each pocket assignment to be used on a different pass of the documents through the sorting apparatus. The numbers and pocket assignments stored in the memory of the sorting apparatus are the stored sorting program of the sorting apparatus.

In order to change the sorting program so that different numbers other than those stored in the memory will be recognized and the documents bearing these numbers will be directed to the desired pockets, it is necessary to change the numbers and pocket assignments stored in the memory. In many of the systems of the prior art no provision is made for changing the sorting program whatsoever, and those systems in which provision is made require expensive additional equipment or a time-consuming laborious manual process of changing the program. The present invention provides a sorting program which is quick, can be carried out with ease by the operator, and can be carried out even while a sorting operation is in process. To effect a change in the sorting program according to the present invention a program change document is used. The program change document is similar to the documents to be sorted except that it has recorded thereon the program change information along with a special symbol. The program change document is fed to the sorting apparatus in the same manner that the documents to be sorted are fed thereto. The sorting apparatus detects the special symbol and in response thereto changes the information stored in its memory in accordance with the program change information recorded on the program change document. In this manner a program change may be effected even while a sorting operation is being carried out with substantially no interruption in the sorting operation and without using any additional equipment.

Accordingly it is an object of this invention to provide an improved data processing apparatus.

It is a further object of this invention to provide an improved method and apparatus for changing the program of a data processing apparatus.

It is a still further object of this invention to provide an improved sorting apparatus.

It is a still further object of this invention to effect a simpler and easier program change in data processing equipment.

It is a still further object of this invention to effect a program change in data processing equipment while a data processing operation is being carried out.

It is a still further object of this invention to reduce the time of effecting a program change in data processing equipment.

It is a still further object of this invention to change the program of data processing equipment more economically.

Further objects and advantages of this invention will become readily apparent as the following detailed description of a preferred embodiment of the invention unfolds and when taken in conjunction with the drawings, wherein:

FIG. 1 illustrates a check adapted for sorting by the apparatus of the present invention;

FIG. 3 illustrates schematically how the sorting program is stored on the magnetic drum, which constitutes the memory of the sorting apparatus of the present invention;

FIG. 4 illustrates a program change document adapted for use in the present invention;

FIG. 5 is a block diagram showing in more detail the pocket control gate shown as a block in FIG. 2; and FIG. 6 is a block diagram illustrating in more detail the slot selector of the apparatus of the present invention shown as a block in FIG. 2.

Figure 2:
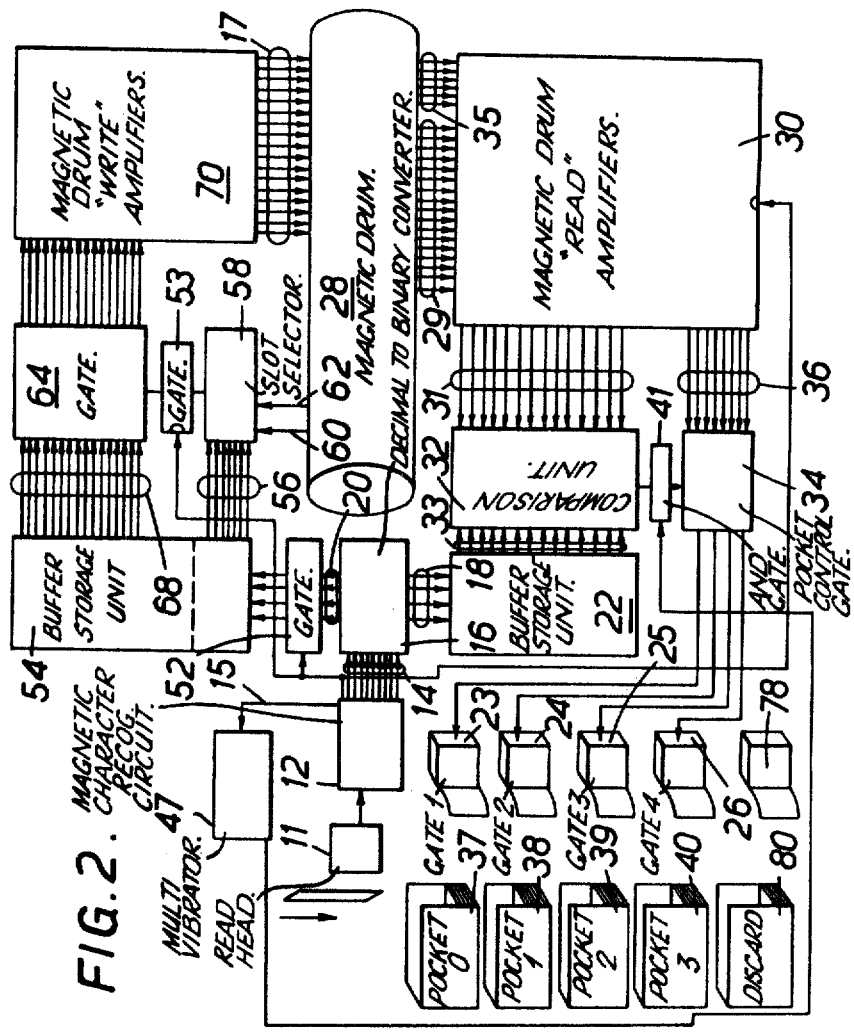
FIG. 2 illustrates a block diagram of the sorting apparatus of the present invention.

The sorting apparatus, which is disclosed in the detailed description below and in the drawings for the purposes of providing a specific embodiment of the invention, is adapted to sort checks in accordance with transit numbers recorded on the checks in magnetic ink. Most of the inventive features of this specific embodiment are applicable to other types of sorting apparatus and as pointed out above many of the inventive features are applicable in general to other kinds of data processing equipment.

The checks to be sorted by the apparatus of the present invention each have an eight-digit transit number recorded across the lower side of the check. In the exemplary check shown in FIG. 1 this transit number is 1234–7896. The transit numbers are recorded in magnetic ink on the checks so that they can be detected by a magnetic reading head and recognized by magnetic character recognition circuitry. On each side of the transit number there is recorded in magnetic ink a transit number symbol, designated on the exemplary check in FIG. 1 by the reference number 13. As shown in FIG. 2, the checks are fed one at a time past a reading head 11 so that the magnetic characters on the check are sensed in sequence by the reading head 11 going from right to left. The signals generated in the reading head 11 are fed to a magnetic character recognition circuit 12, which in response thereto produces output signals on the ten output lines 14 indicative of the digits sensed by the reading head 11. The reading head 11 will generate a signal peculiar to the character printed in magnetic ink currently passing under the reading head 11 and the magnetic character recognition circuit 12 will recognize from this signal which of the ten characters in the arabic numeral system the signal is peculiar to and accordingly will produce a signal on an appropriate one of the ten output lines 14. The one of the ten output lines on which the signal is produced indicates which of the ten characters in the arabic numeral system has just passed under the reading head 11. The details of the magnetic recognition circuit 12 are disclosed in U.S. Patent No. 2,924,812 to Merritt et al. and assigned to the General Electric Company. Since the characters printed in magnetic ink pass in sequence under the reading head 11, the magnetic character recognition circuit 12 will produce signals on the lines 14 indicative of the decimal digits represented by these characters in the same sequence. When the reading head 11 senses one of the transit number symbols 13 (FIG. 1) and applies a signal characteristic of the transit number symbol to the magnetic character recognition circuit 12, the magnetic character recognition circuit will recognize this characteristic signal and in response thereto will produce an output pulse on line 15. Thus the magnetic character recognition circuit will apply a pulse to line 15 before and after each transit number is sensed by the reading head 11 on the checks to be stored. In this manner an indication is provided of each period during which a transit number is being read out from a check.

The ten output lines 14 are applied to a decimal-to-binary convertor 16 which in response to the signal on one of the lines 14 produces binary signals on lines 18 indicating the decimal digit indicated on the lines 14. Since it requires four binary digits to indicate the full range of decimal digits from 0 to 9, there are four lines 18 and the four binary signals appearing simultaneously on the lines 18 will indicate one decimal digit. Thus the decimal digits indicated by the characters passing under the reading head 11 in sequence will each be indicated by binary signals appearing on the lines 18 in the same sequence in which the characters pass under the reading head 11. For example, if the exemplary check shown in FIG. 1 bearing the transit number 1234–7896 is passed under the reading head 11, the first binary number indicated on lines 18 will be 0110 since the first character to be sensed by the reading head is a 6. After the signals representing the binary number 0110 appear on lines 18, signals appear on line 18 to represent in sequence the binary numbers 1001, 1000, 0111, 0100, 0011, 0010, and 0001 which correspond to the arabic characters 9, 8, 7, 4, 3, 2 and 1 respectively as these characters follow the character 6 in sequence past the reading head 11. Circuits for performing the conversion from decimal to binary are well known in the art. A simple diode matrix would be sufficient. Circuits of this type are disclosed in chapter 6 of the text entitled Switching Circuits by Humphrey and in section 13–15 of the text entitled Pulse and Digital Circuits by Millman and Taub, both published by McGraw-Hill in 1958 and 1956 respectively.

In the system used in the apparatus to represent binary numbers, ONE's are represented by positive pulses and ZERO's are represented by negative pulses. The binary signals on the lines 18 are applied to a buffer storage unit 22, which has eight stages. The buffer storage unit 22 consists of four eight-stage shift registers with each stage of the buffer storage unit comprising four corresponding stages of the four shift registers. The shift registers of the buffer storage unit 22 are connected severally to the lines 18 so that the binary signals appearing on the lines 18 are stored in the first stages of the four shift registers of the buffer storage unit 22, or in other words in the first stage of the buffer storage unit. When the next character passing under the reading head 11 is converted to binary signals on the lines 18, the shift registers of the buffer storage unit 22 are actuated to shift the information stored therein back one stage so that the binary signals stored in the first stage of the buffer storage unit 22 are shifted to the second stage, whereupon the binary signals on the lines 18 representing the second character sensed by the reading head 11 from the passing check are stored in the first stage of the buffer storage unit. In a similar manner each decimal digit of the transit number of the check currently passing the reading head 11 is read out and converted to binary signals on the lines 18 and stored in the first stage of the buffer storage unit 22 in sequence with the binary signals representing the preceding digits of the transit number detected by the reading head 11 being shifted down through the succeeding stages of the buffer storage unit 22. When the last character of the transit number has been read by the reading head 11 and converted to binary signals and then stored in the first stage of the buffer storage unit 22, the buffer storage unit will be full with each stage of the buffer storage unit storing the binary signals representing a different decimal digit of the transit number recorded on the check that just passed under the reading head 11. Thus the transit number of the check that just passed under the reading head 11 is stored in the buffer storage unit 22.

The individual stages of the shift registers of the buffer storage unit 22 are bistable storage units, each capable of storing one binary signal and are of the type which will generate continuous output signals indicative of the binary signals stored therein. An output is taken from each stage of the shift registers of the buffer storage unit 22 and applied continuously to a comparison circuit 32 in parallel over lines 33 and in this manner the transit number which is stored in the buffer storage unit 22 and which is the transit number of the check that just passed under the reading head 11 is applied to the comparison circuit 32. The shift registers which make up the buffer storage unit 22 are well known in the art and can be designed in accordance with techniques disclosed in the aforementioned text by Millman and Taub.

After passing under the reading head 11 the check proceeds to a series of mechanical directing gates 23 through 26, which direct the check into the selected pocket. While the check is proceeding to the directing gates 23 through 26, transit numbers are continuously being read out from a magnetic drum 28 on lines 29, amplified by magnetic drum read amplifiers 30, and applied to the comparison circuit 32 over lines 31. The transit numbers are recorded on the magnetic drum 28 by recording their decimal digits in binary form and as a result binary signals representing each decimal digit of each eight-digit transit number will be applied to the comparison circuit 32. The binary signals representing each transit number read out from the magnetic drum 28 are applied in parallel over lines 31 to the comparison circuit 32 and each transit number stored on the magnetic drum is applied in sequence to the comparison circuit 32 in this manner. The comparison circuit 32 compares the transit numbers applied thereto over lines 31 and 33 by comparing the corresponding binary signals on lines 31 and 33. When the comparison circuit 32 detects a coincidence between the transit number being applied thereto on lines 31 with the transit number applied thereto on lines 33 as represented by a coincidence of the corresponding binary singals, it applies an enabling signal to a pocket control gate 34 through a normally enabled AND gate 41. Comparison circuits for performing this function are well known in the data processing art and circuit of this type are disclosed in Section 13-3 of the aforementioned text by Millman and Taub.

With each transit number read out from the magnetic drum on lines 29, binary signals representing the pocket assignments for that transit number are read out on lines 35, are amplified by the read amplifiers 30, and applied to the pocket control gate 34 over lines 36. When the comparison circuit 32 applies an enabling signal to the pocket control gate 34, the pocket control gate 34 in response to the binary signals representing the pocket assignments applied thereto over the lines 36 will apply an actuating signal to actuate one of the gates 23–26. The actuated gate will direct the check proceeding to the gates 23 through 26 from the reading head 11 to one of the pockets 37 through 40 selected in accordance with the pocket assignments recorded with the transit number, which is identical to the transit number recorded in magnetic ink on the check.

During the time the buffer storage unit 22 is being filled with the digits of a transit number read out, it is possible that coincidence between the signals on lines 33 and 31 could occur and cause the comparison circuit 32 to produce an output signal in response to this coincidence. Such a coincidence signal would not indicate that the transit number read out from the drum coincides with a transit number read out from a check by the reading head 11 because the buffer storage unit 22 is only partly filled with the digits of the transit number on the check currently being sensed by the reading head 11. Therefore such a coincidence signal is false and cannot be allowed to enable the pocket control gate 34. For this purpose the normally enabled AND gate 41 is provided. The AND gate 41 is normally enabled by an output signal from a multivibrator 47. However, while the buffer storage unit 22 is being filled with the digits of a transit number, the multivibrator 47 does not apply an enabling signal to the AND gate 41, and any spurious coincidence signal generated by the comparison circuit 32 during this period will not be allowed to pass to the pocket control gate 34. The multivibrator 47 applies an enabling signal to the AND gate 41 when it is in one of its two states and does not apply an enabling signal to the AND gate 41 when it is in its other state. The pulses produced on line 15 by the character recognition circuit 12 are applied to a switching input of the multivibrator 47 and whenever the character recognition circuit 12 applies a pulse to the switching input it will cause the multivibrator 47 to change states. Thus whenever a transit number symbol is sensed by the reading head 11, the multivibrator 47 will switch to its opposite state. The multivibrator 47 is normally in the state in which it applies an enabling signal to the AND gate 41. Since a transit number symbol is positioned on each side of the transit number on each check, the multivibrator 47 will be switched to the state in which it does not apply an enabling signal to the AND gate 41 just before the transit number on each check is sensed by the reading head 11 and it will be switched back to the state in which it applies an enabling signal to the AND gate 41 immediately after the transit number on each check is sensed by the reading head 11. In this manner the AND gate 41 is disabled during the period in which the buffer storage unit 22 is being filled and any spurious coincidence signal generated during this period is prevented from being applied to the pocket control gate 34. The multivibrator 47 can be made monostable with a time period slightly greater than the time it takes to read out a transit number so that it is assured that the multivibrator is normally in the state in which it applies an enabling signal to the AND gate 41.

As shown in FIG. 3, which illustrates how information is recorded on the magnetic drum 28 of FIG. 2, the magnetic drum has 42 peripheral tracks in which information is recorded. A magnetic reading head is associated with each track to read the information recorded in that track. Each track is divided into 4000 cells in each of which a binary signal may be recorded. In the track furthermost to the left on the magnetic drum a signal is recorded in only one of the cells so that a pulse will be produced in the reading head associated with the track once for each revolution of the drum when this cell passes the reading head. This track is the index track and the single signal recorded in this track provides a reference from which the angular position of the drum can be referenced. In the track second to the left a signal is recorded in every cell around the drum. The second track is referred to as the clock track and the reading head associated with this track will generate a pulse as each cell rotates past this reading head. By counting how many pulses are generated in the clock track reading head after the generation of the pulse in the index track reading head the current position of the drum can be continuously determined. The remaining tracks on the drum are used for recording the information. In the cells of these tracks a ONE is recorded by recording a positive pulse and ZERO is recorded by recording a negative pulse. Thirty-two of these tracks are used for recording transit numbers and eight are used for recording pocket assignments. Each transit number and the pocket assignments associated with such transit number are recorded in cells in the same angular position axially across the drum, one cell in each of the forty information tracks being used. The cells in the same angular position extending axially across the drum comprise a slot and accordingly the binary signals representing a single transit number and the binary signals representing the pocket assignments associated with this transit number will all be stored in the same slot. Four cells are needed to record the binary signals representing each decimal digit of a transit number. Thus thirty-two cells extending across thirty-two tracks are required to record an eight-digit transit number. The binary signals recorded in the thirty-two tracks recording the transit numbers are read out simultaneously in parallel onto thirty-two lines 29 and amplified by the read amplifiers 30 and applied on thirty-two lines 31 to the comparison circuit 32. In the specific embodiment of the invention there are four different pockets. Thus, to record a pocket assignment on the magnetic drum, two cells are required extending across two tracks. Four pocket assignments are recorded in the same slot with each transit number. Therefore eight cells extending across eight tracks are used to record the pocket assignments with each transit number. The four pocket assignments stored in the same slot with each transit number are each to be used in a different pass of the checks through the sorting mechanism. In the first pass an unsorted stack of checks is fed past the reading head 11 and sorted into the four pockets 37 through 40 in accordance with the pocket assignment stored with each transit number in the seventh and eighth track from the right hand side of the magnetic drum. On the second pass the stacks of checks in each of the pockets 37 through 40 are separately sorted again into the four pockets 37 through 40 using the pocket assignments stored in the fifth and sixth tracks from the right hand side of the drum. Thus after the second pass the checks are sorted into sixteen stacks. These sixteen stacks on the third pass are separately sorted using the pocket assignments stored in the third and fourth tracks from the right hand side of the drum, thus sorting the checks into sixty-four stacks. The pocket assignments for the fourth pass are stored in the first and second tracks from the right hand side of the drum. After the fourth pass in which the sixty-four stacks are separately sorted, the checks will be sorted into 256 stacks. The digital signals representing the pocket assignments for each transit number are read out simultaneously with the transit numbers in parallel on lines 35 and are then amplified by the amplifiers 30 and applied to the pocket control gate 34 over lines 36.

The pocket control gate 34, which is shown as a block in FIG. 2, is illustrated in more detail in FIG. 5. As shown in FIG. 5, it comprises a diode decoding matrix 42, which is similar in construction to the decimal to binary converter 16. The lines 36 are connected to the diode matrix 42 through switches 43 through 46. Each of the switches 43 through 46 is double-pole-double-throw connecting a different pair of the lines 36 carrying one pocket assignment to the diode matrix 42. Only one of the switches 43 through 46 will be closed passing the signals representing one pocket assignment to the decoding matrix 42. Which of the switches 43 through 46 will be closed to pass the signals representing a pocket assignment to the diode matrix 42 will depend upon which pass of the sorting operation is being carried out. On the first pass the switch 43 will be closed passing the binary signals stored in the seventh and eighth tracks from the right hand side of the drum to the diode matrix 42 and the switches 44 through 46 will be open. Similarly, on the second pass the switch 44 will be closed and the switches 43, 45 and 46 will be open so that the signals stored in the fifth and sixth tracks from the right hand side of the drum will be passed to the diode matrix 42. Likewise the switches 45 and 46 will be closed on the third and fourth passes respectively, so that the signals stored in the third and fourth tracks and first and second tracks respectively from the right hand side of the drum will be applied to the diode matrix 42. The diode matrix 42, in response to the binary signals applied thereto from one pair of the lines 36 will apply a signal to one of four output lines 48 which are applied to AND gates 50. The outputs from the AND gates 50 are severally applied to the gates 23 through 26. The enabling signal from the comparison circuit 32 through the AND gate 41 is applied to all of the AND gates 50. When the AND gates 50 receive the enabling signal from the comparison circuit 32, and AND gate 50 which receives a signal from the decoding matrix 42 will apply an actuating signal to one of the gates 23 through 26 causing this gate to be actuated and to direct the approaching check to the one of the pockets 37 through 40 which is under this gate. In this manner each check passing the reading head 11 is directed to the correct pocket 37 through 40.

The speed of the rotation of the drum 28 is fast enough for it to pass through at least one complete revolution by the time the check passes from the reading head 11 to the gates 23 through 26, so that each transit number stored on the drum will have a chance to be read out and compared with the transit number stored in the buffer storage unit 22 during the time that a check is passing from the reading head 11 to the gates 23 through 26. The time constants of the system are such that the actuated one of the gates 23 through 26 will remain actuated until after the check has had time to reach the gates 23 through 26.

To change the sorting program represented by the transit numbers and the pocket assignments recorded on the drum 28, a program change document is used such as that illustrated in FIG. 4. This program change document is fed to the reading head 11 in the same manner that the checks are fed to the reading head 11, and in fact it may be included in a stack of checks to be stored and fed to the reading head 11 in the middle of a sorting operation carried out on the stack of checks. The program change document has printed in magnetic ink in its lower right hand corner a special program symbol, which is designated by the reference number 51 in FIG. 4. Aligned with the special program symbol along the lower edge of the program change document approximately midway between its ends there is recorded in magnetic ink a transit number, which in the exemplary document shown in FIG. 4 is 5678–3210. A four-digit slot number, which in the exemplary document in FIG. 4 is 3000, is recorded in magnetic ink in the lower left hand corner of the program change document aligned with the transit number and the special program symbol. Between the transit number and the special program symbol four digits representing four pocket assignments are recorded in magnetic ink on the program change document. In the exemplary document shown in FIG. 4 these pocket assignment digits are 0, 1, 2 and 3.

Since the magnetic characters on the document are read from right to left by the reading head 11, the special program symbol will be the first symbol sensed by the reading head 11. The magnetic character recognition circuit 12, in response to the special program symbol sensed by the reading head 11, generates a signal which disables the read amplifiers 30, stopping the reading out of information from the magnetic drum, and which also disables a gate 53 and enables a gate 52. This enabling and disabling signal generated by the magnetic character recognition circuit 12 is produced for a sufficient time for the remaining characters printed in magnetic ink on the program change document to be read out and is timed to cut off immediately after all the characters have been read out. As shown in FIG. 4 the characters representing pocket assignments will be the next numbers to pass under the reading head 11, and the reading head 11 will read the characters 3, 2, 1 and 0 in that order from the exemplary document. The reading head 11 will then detect the transit number going from right to left and finally the reading head 11 will detect the characters representing the digits of the slot number going from right to left. The magnetic character recognition circuit 12 will produce a signal on one of the lines 14 representative of each digit as it is read in sequence by the reading head 11 and the decimal to binary converter 16 will generate binary signals representing each digit as the magnetic characters representative thereof pass under the reading head 11. The decimal to binary converter in addition to producing its binary output signals on lines 18 also produces them on lines 20, which are applied to the gate 52. The gate 52 upon being enabled by the signal from the magnetic character recognition circuit 12 passes the binary signals on lines 20 to a buffer storage unit 54.

The buffer storage unit 54, like the buffer storage unit 22, comprises four shift registers, one for each of the binary signals produced on the lines 20. The buffer storage unit 54 comprises sixteen stages with each stage comprising the corresponding stages of the four shift registers. The first four stages of the buffer storage unit are used to ultimately store in binary form the four decimal digits of a slot number read out from a program change document. The next eight stages are used ultimately to store in binary form the decimal digits of an eight-digit transit number read out from a program change document. The last four stages of the buffer storage unit are used ultimately to store in binary form the four decimal digits read from a program change document representing pocket assignments. Since there are only four pockets which are numbered 0, 1, 2 and 3, only two binary signals are required to represent any pocket assignment. Hence only two shift registers are required in the last four stages of the buffer storage unit 54. Therefore the two of the shift registers which store the most significant binary digits in the buffer storage unit 54 need have only twelve stages while the remaining two shift registers must have sixteen shift stages. The buffer storage unit 54 operates in a manner similar to the buffer storage unit 22. The binary signals representing the first digit read out from the program change document are stored in the first stage of the buffer storage unit 54. When the binary signals representing the second digit read out from the program change document are applied to the buffer storage unit 54, the binary signals stored in the first stage of the buffer storage unit 54 are shifted to the second stage and the binary signals representing the second digit read out are stored in the first stage. As the binary signals representing each decimal digit read out from the program change document appear on the lines 20 and are applied to the buffer storage unit 54, they are stored in the first stage of the buffer storage unit 54 and the digits already stored in the buffer storage unit 54 are shifted back one stage. In this manner the sixteen stages of the buffer storage unit 54 are filled up with binary signals representing the sixteen decimal digits recorded on the program change document. Since the program change document is sensed from right to left, the four decimal digits representing the pocket assignments will be read out first and stored in the last four stages. The eight decimal digits representing the transit number will be stored in the middle eight stages and the four decimal digits representing the slot number will be stored in the first four stage.

As in the case of the buffer storage unit 22, the individual stages of the shift registers making up the buffer storage unit 54 are bistable storage units of the type capable of producing continuous output signals representative of the binary signals stored therein. Outputs are taken from each of the first four stages of each of the four shift registers making up the first four stages of the buffer storage unit 54 and are applied to a slot selector 58 over lines 56 so that the binary signals representing the four decimal digits of the slot number stored in the first four stages of the buffer storage unit 54 are applied to the slot selector 58.

The output pulses from the index track and the clock track of the magnetic drum 28 produced in the reading heads associated with these tracks are also applied to the slot selector 58 over lines 60 and 62 respectively. Thus a pulse will be applied to the slot selector 58 over line 60 each time the indexing signal recorded in the index track passes the reading head associated with the index track. A pulse will be applied to the slot selector 58 over line 62 as each slot of the drum 28 comes into alignment with the reading head associated with the clock track. The slot selector 58 counts the pulses on the line 62 and registers the number counted and compares it with the slot number represented as stored in the first four stages of the buffer storage unit 54 by the signals on the lines 56. When the number registered by the slot selector 58 coincides with the number represented on the lines 56, the slot selector 58 will apply an enabling signal to the gate 64 through the gate 53, which will be enabled at this time. When a pulse is applied to the slot selector 58 over line 60 indicating that the indexing signal has passed under the reading head associating with the index track, the count registered in the slot selector 58 is set to zero, and the slot selector begins counting the pulses on line 62 again. The number registered in the slot selector 58 indicates continuously the angular position of the magnetic drum 28.

In addition to the reading heads for reading out the information stored in the information tracks, the magnetic drum 28 also has writing heads for recording binary signals in the cells of each information track. The reading heads may serve as the writing heads or separate writing heads may be provided. The slot which passes under the writing heads when the output pulse is produced on line 60 from the index track has the slot number 0000. The slots are numbered from the slot 0000 in sequence in which they pass the writing heads up to the slot 3999. The next slot passing under the writing heads after slot 3999 will be slot 0000, since there are only 4000 slots around the periphery of the drum. It will now be evident that the number registered in the slot selector 58 will continuously indicate the slot number of the slot currently passing under the writing heads.

When the slot selector 58 applies an enabling signal to the gate 64, the slot number of the slot passing under the writing heads will be identical to the slot number stored in the first four stages of the buffer storage unit 54. The binary signals stored in the last twelve stages of the buffer storage unit 54 representing the four pocket assignments and the eight decimal digits of the transit number are applied over lines 68 to the gate 64. The binary signals on lines 68 are gated to the write amplifiers 70 when the slot selector 58 applies an enabling signal to the gate 64. When the write amplifiers 70 receive the binary signals from the gate 64, the write amplifiers 70 record these binary signals in the forty information tracks on the magnetic drum 28 in the slot currently passing under the writing heads. This slot will have the slot number stored in the first four stages of the buffer storage unit 54. Thus the transit number and the pocket assignments read from the program change document are recorded in the selected slot on the magnetic drum 28. Because the gate 53 is disabled by the signal generated by the magnetic character recognition circuit 12 in response to the special program symbol being detected by the reading head 11, the slot selector 58 is prevented from applying an enabling signal to the gate 64 for the duration of this signal generated by the magnetic character recognition circuit 12. In this manner spurious coincidence signals generated by the slot selectors during the time the buffer storage unit 54 is being filled are prevented from enabling the gate 64.

As shown in FIG. 6, the slot selector 58 comprises four counters 71 through 74. Each of the counters 72 through 74 is a four-stage binary counter which is connected to re-cycle to zero upon reaching a count of 10 instead of upon reaching a count of 16 at which binary counters of four stages would normally re-cycle to zero. The output pulses from the clock track of the magnetic drum on line 62 are applied to the input of the counter 74, which will count these pulses. Since a pulse will be produced on line 62 for each slot of the drum 28 as the drum rotates, the count registered in the counter 74 will increase by one as each slot passes the reading head associated with the clock track until the count in the counter 74 reaches 10, at which point the counter 74 re-cycles to zero and starts counting over again. Each time the counter 74 re-cycles to zero it applies a pulse to the input of the counter 73, which counts these pulses. The count registered in the counter 73 thus increases by one each time ten slots pass by the reading head associated with the clock track until the count registered in the counter 73 reaches 10, at which time it re-cycles to zero and applies a pulse to the counter 72. The counter 72 counts the pulses applied thereto by the counter 73 and thus the count registered in the counter 72 increases by one each time a hundred slots pass by the reading head associated with the clock track. The counter 72 is connected to apply a pulse to the counter 71 each time it re-cycles and the counter 71 counts the pulses applied thereto by the counter 72. Thus the count registered in the counter 71 will increase by one each time a thousand slots pass by the reading head associated with the clock track. The output from the index track on line 60 is applied to all of the counters 71 through 74 and when a pulse is produced on line 60 it sets all of the counters to zero. In this manner the count registered in the slot selector continuously indicates the slot number of the slot currently passing under the writing heads. Since there are only 4000 slots around the magnetic drum, the counter 71 which indicates the slot in thousands needs only two stages and it is connected to re-cycle at a count of 4. The individual stages of the counters 71 through 74 are bistable storage units each of which is capable of storing one binary signal and which is capable of continuously generating an output signal indicative of the binary signal stored therein. Outputs are taken from each stage of each of the counters 71 through 74 and binary signals stored in each stage are applied from these outputs to a comparison circuit 76, which is similar in construction to the comparison circuit 32. The binary signals on the outputs from the counter 74 will represent the units digit of the slot number of the slot currently passing under the writing heads. Similarly the binary signals on the outputs from the counters 73, 72 and 71 will represent the tens, hundreds and thousands digits respectively of the slot number of the slot currently passing under the writing heads. The binary signals on lines 56 indicative of the decimal digits of the slot number registered in the first four stages of the buffer storage unit 54 are also applied to the comparison circuit 76. When the binary signals applied to the comparison circuit 76 from the buffer storage unit 54 are identical to the corresponding binary signals applied to the comparison circuit 76 from the counters 71 through 74, the slot number registered in the buffer storage unit 54 will coincide with the slot number registered in the slot selector 58 and the comparison circuit 76 will apply an enabling signal to the gate 64.

In this manner a change in the stored sorting program on the magnetic drum 28 is effected quickly and easily and may be carried out even while the sorting apparatus is in the process of a sorting operation with virtually no interruption of the sorting process.

The program change document after passing the reading head 11 will proceed past all of the gates 23 through 26, since none of them will be actuated as a result of the read amplifiers 30 being deactuated, to a deflector 78, which will deflect the program change document into a discard pocket 80. The discard pocket 80 also collects any checks which fail to be deflected into one of the pockets 40 for any reason such as for example its transit number not being recorded on the magnetic drum.

The above description is of a preferred embodiment of the invention, and many modifications may be made thereto without departing from the spirit and scope of the invention, which is limited only as defined in the appended claims.

What is claimed is:

1. In an electronic data processing apparatus having a rotatable magnetic drum to store information in a plurality of slots angularly spaced around said drum, each of said slots having a different address, input means to receive data to be processed, and means to perform logical operations on the data received by said input means in accordance with the information stored on said magnetic drum, means to record information on said magnetic drum in the slots passing in recording relationship therewith, counting means to count the slots as they pass in recording relationship with said recording means, buffer storage means to store data representing information to be recorded in the slot and the address of the slot in which the information is to be recorded, a normally disabled gate connected to feed to said recording means the information to be recorded which is stored in said buffer storage means, means to enable said gate when the count registered by said counting means coincides with the address stored in said buffer storage means and gating means coupled between said buffer storage and said input means responsive to a special signal received by said input means to feed to said buffer storage means data received by said input means representing information to be stored on said magnetic drum and an address on said magnetic drum.

2. An electronic data processing apparatus comprising a storage means to store information, input means to receive data to be processed, and means to perform logical operations on the data received by said input means in accordance with the information stored in said storage means, means responsive to a special instruction signal received by said input means to disable said means to perform logical operations and to change the information stored in said storage means in accordance with the data received by said input means along with said special instruction signal, and output means to selectively use said processed data.

3. An electronic data processing apparatus comprising a storage means to store information, input means to receive data to be processed, and means to perform logical operations on the data received by said input means in accordance with the information stored in said storage means, means responsive to a special instruction signal received by said input means to disable said means to perform logical operations and to change the information stored in said storage means in accordance with the data received by said input means along with said special instruction signal, and a plurality of output means to selectively use said processed data.

4. An apparatus for processing data comprising input means to receive the data to be processed along with identifying information, a plurality of outputs into which said data is to be distributed, a storage means to store a plurality of sorting numbers and at least one output assignment with each sorting number, means to compare each sorting number stored in said storage means with the identifying information detected by said input means and to direct the data to the outputs selected by the output assignments stored with the sorting numbers stored in said storage means coinciding with the identifying information fed to said input, and means to change one of the sorting numbers stored in said storage means and the output assignment recorded therewith in response to a special signal detected by said input means along with said data fed to said input means.

5. An apparatus for processing data identified by sorting numbers comprising input means to receive the data to be processed and to detect the sorting numbers, a plurality of outputs into which said data is to be sorted, a storage means to store a plurality of sorting numbers and at least one output assignment with each sorting number, means to compare each sorting number stored in said storage means with the sorting numbers detected by said input means and to direct said data to the output selected by the output assignments stored with the sorting numbers stored in said storage means coinciding with the sorting numbers received with said data and means selectively operable to store in said storage means a new sorting number along with a new output assignment detected by said input means along with said data fed to said input means.

References Cited

UNITED STATES PATENTS

| | | |
|---|---|---|
| 2,220,502 | 11/1940 | Weinlich. |
| 2,540,654 | 2/1951 | Cohen. |
| 2,800,277 | 7/1957 | Williams. |
| 2,885,659 | 5/1959 | Spielberg. |
| 2,916,210 | 12/1959 | Selmer. |
| 2,988,215 | 6/1961 | Nelson. |
| 2,996,184 | 8/1961 | Barton. |
| 3,053,449 | 9/1962 | Hoberg. |
| 3,067,406 | 12/1962 | Southard. |

ROBERT C. BAILEY, *Primary Examiner.*

R. ZACHE, *Assistant Examiner.*